TELEVISION AND LIKE DATA TRANSMISSION SYSTEMS

Filed Aug. 26, 1963 8 Sheets-Sheet 1

United States Patent Office 3,324,237

Patented June 6, 1967

3,324,237

TELEVISION AND LIKE DATA TRANSMISSION SYSTEMS

Edward Colin Cherry, Shere, Surrey, and Donald Edwin Pearson and Marcus Paul Barton, London, England, Muthanna Hussain Kubba, Baghdad, Iraq, and Herbert Bernhardt Voelcker, Rochester, N.Y., assignors to National Research Development Corporation Filed Aug. 26, 1963, Ser. No. 304,730
Claims priority, application Great Britain, Aug. 29, 1962, 33,125/62
15 Claims. (Cl. 178—6)

This invention relates to television systems in particular and to data transmission systems generally.

It is a characteristic of data transmission systems that the signal transmitted from the transmitter to the receiver of the system has periods of high information content and other periods of low information content. The corresponding electrical signal has a wide frequency, short-term bandwidth during the periods of high information content and a narrow frequency, short-term bandwidth during the periods of low information content.

Conventional systems employ a wide-bandwidth transmission channel, the necessary bandwidth of which is determined by the bandwidth of the signal during periods of high information content. Usually the choice has to be a compromise, so that although the signal bandwidth is accommodated during periods of high information content, it is not accommodated during periods of maximum information content.

In a conventional television system, the video signal bandwidth, during periods of maximum signal detail may extend considerably above 3 mc./s. The transmission channel may, nevertheless, be limited to 3 mc./s. bandwidth, or to such comparable figure as it is decided gives the viewer a subjectively acceptable amount of detail in the viewed picture.

In such systems, periods of high information content form a small proportion of the total signal transmission time. Thus, the available bandwidth of the transmission channel is made use of for only a small proportion of the transmission time. Such a system is clearly uneconomic.

Various systems have been proposed for modifying the original signal, so that the information content thereof is more uniformly distributed in time. In this way, the bandwidth of the transmission channel can be reduced. Alternatively, keeping the conventional wide-bandwidth transmission channel, more information can be transmitted in unit time.

The object of the present invention is to provide an improved system of this form.

In common with the earlier systems proposed the present invention has its most valuable application, at the present time, to television systems. Consequently, it is most convenient to describe the invention as a television system. However, it will be understood that it may be applied also to other data transmission systems, such as picture facsimile and multiplex telephony and telegraphy systems.

A television picture is characterized by areas of uniform brightness, that is low picture detail, and other areas of rapid transitions of brightness, that is high picture detail. Scanning of low-detail areas provides a signal of low information content and narrow, short-term bandwidth; scanning of high-detail areas provides a signal of high information content and wide, short-term bandwidth. The former signal will be referred to herein as a low-detail signal and the latter as a high-detail signal.

Co-pending application No. 209,863, filed June 26, 1963, describes a television or other data transmission system having a transmitter and a receiver connected by a transmission channel of insufficient bandwidth to accommodate the bandwidth of high-detail signals, the transmitter having a scanner for translating a television picture into a corresponding picture signal, a detail detector unit for estimating the detail content of the picture signal continuously according to one of a plurality of discrete picture detail levels and for providing a corresponding picture detail level signal, an analogue-to-digital converter supplied with the picture signal and controlled by the picture detail level signal to provide digital evaluation of picture signal amplitude at discrete sampling instants, the sampling instants being spaced by a chosen one of a plurality of predetermined sampling intervals defining a plurality of different signal sampling rates, the choice of sampling rate being determined by the picture detail level signal, a first multiple-stage store for storing the digital samples of picture signal amplitude, means for extracting from the first store said digital samples at a predetermined extraction rate, means for supplying said samples to said transmission channel, either in digital form or after reconversion to analogue, that is amplitude, form, a storage content unit for continuously examining the number of the digital samples contained in said first store and providing an overload and an underload signal respectively as the first store becomes full or becomes empty, said overload or underload signal being effective to override said choice of signal sampling rate and to choose a signal sampling rate less than or equal to the sample extraction rate in the case of the overload signal or a signal sampling rate greater than or equal to the sample extraction rate in the case of the underload signal, a sample-rate coder for providing digital numbers defining the interval between successive picture signal samples, a second multiple stage store for storing the sample-rate numbers, means for extracting from the second store said sample-rate numbers at the said predetermined extraction rate and coincidently with one of the two picture signal samples to which it relates and means for supplying said sample-rate numbers to said transmission channel, either in digital or analogue form and said receiver supplied both with a picture signal derived from said picture signal samples and a scanning position signal derived from said sample-rate numbers.

The present invention provides an improved form of the system described therein, the improvement comprising a modification of some of the units of that system, whereby the picture signal from the scanner is immediately converted into pulse code modulation form, the pulses being spaced by the shortest of the predetermined sampling intervals, and the code form being multiple-bit binary form comprising binary signals in a plurality of parallel channels. The detail detector examines the picture signal digital samples instead of the original analogue signal. In other respects the system of the present invention is the same as that described in the said co-pending application.

Accordingly, the present invention provides a television or other data transmission system having a transmitter and a receiver connected by a transmission channel of predetermined bandwidth more than sufficient to accommodate the bandwidth of low-detail signals but less than sufficient to accommodate the bandwidth of high-detail signals, the transmitter having a scanner for translating a television picture into a corresponding picture signal, an analogue-to-digital converter supplied with the picture signal to provide digital evaluation of picture signal amplitude at discrete sampling instants, the sampling instants being spaced by the shortest one of a plurality of predetermined sample intervals, a detail detector for examining the digital picture signal samples and for estimating the detail content of the picture signal continuously according to one of a plurality of discrete picture detail levels, and for providing a corresponding picture detail level signal, a first multiple-stage store for storing the digital picture signal samples, means for supplying to the first store selected digital picture signal samples at any one of the said plurality of predetermined sample intervals, the sample intervals between picture samples supplied to the first store defining a plurality of predetermined sample supply rates, the choice of sample supply rate being determined by the picture detail level signal, means for extracting from the first store said digital samples at a predetermined extraction rate, means for supplying said samples to said transmission channel, either in digital form or after reconversion to analogue, that is amplitude, form, a storage content unit for continuously examining the number of digital samples contained in said first store and for providing an overload and an underload signal respectively as the first store becomes full or becomes empty, said overload or underload signal being effective to override said choice of digital sample supply rate to the first store and to choose a digital sample supply rate not greater than the sample extraction rate in the case of the overload signal or a digital sample supply rate not less than the sample extraction rate in the case of the underload signal, a sample supply rate coder for providing digital numbers defining the interval between successive digital picture signal samples supplied to the first store, a second multiple stage store for storing the sample supply rate numbers at the sample supply rate determined by the said picture detail level signal and coincidently with one of the two picture samples to which it relates, means for extracting from the second store said sample supply rate numbers at the said predetermined extraction rate, and means for supplying said sample supply rate numbers to said transmission channel, either in digital or analogue form, and said receiver being supplied both with a picture signal derived from said picture signal samples and a scanning position signal derived from said sample supply rate numbers.

In order that the invention may be clearly understood, one embodiment thereof, which is a monochrome television system, will now be described in detail, by way of example, with reference to the accompanying drawings, in which:

FIG. 1 is a block schematic diagram showing the general arrangement of the system;

FIGS. 2*a* to 2*f* are a series of amplitude/time waveform diagrams representing the signals appearing at various points of the circuit of FIGS. 3 and 4;

Figure 1:
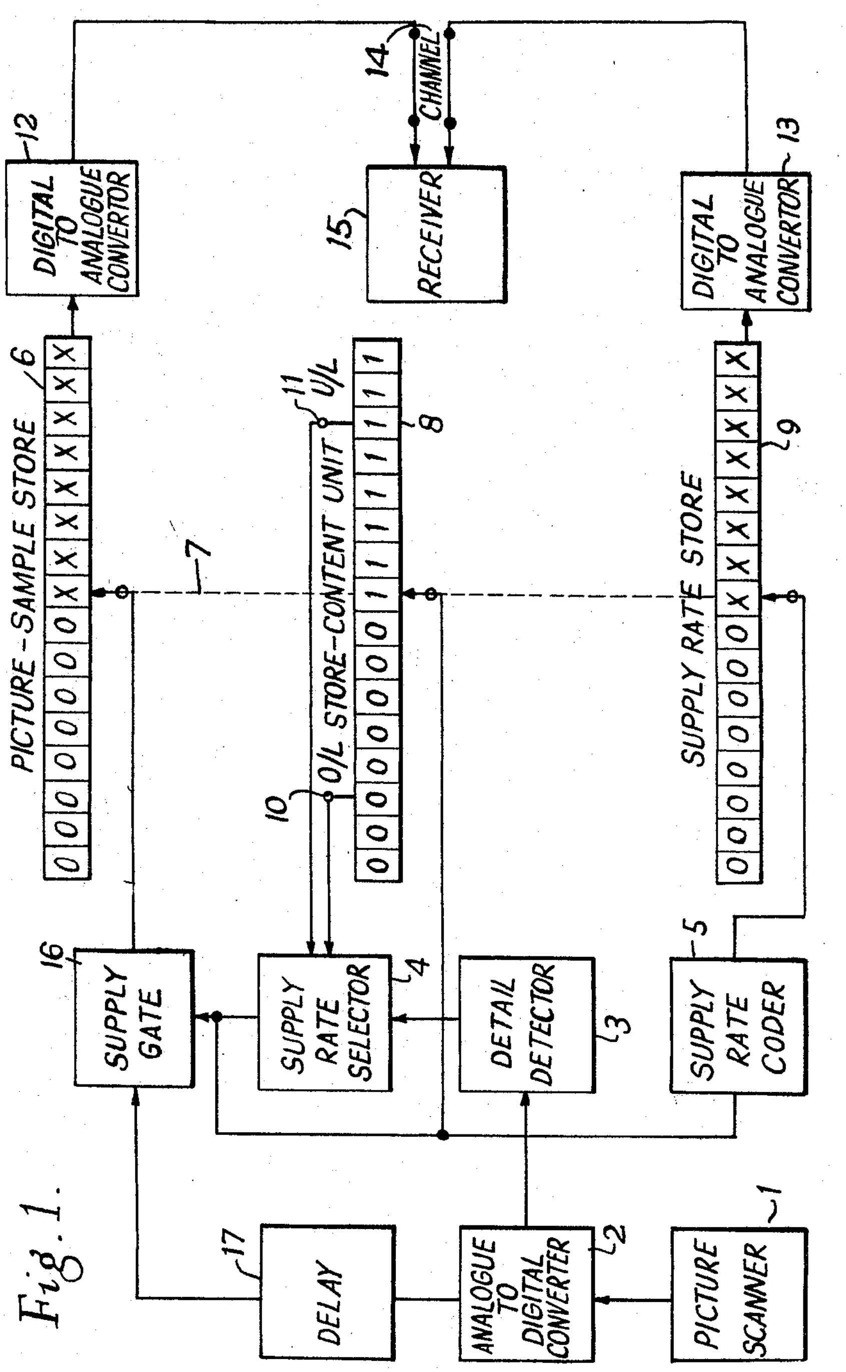
Figure 10:
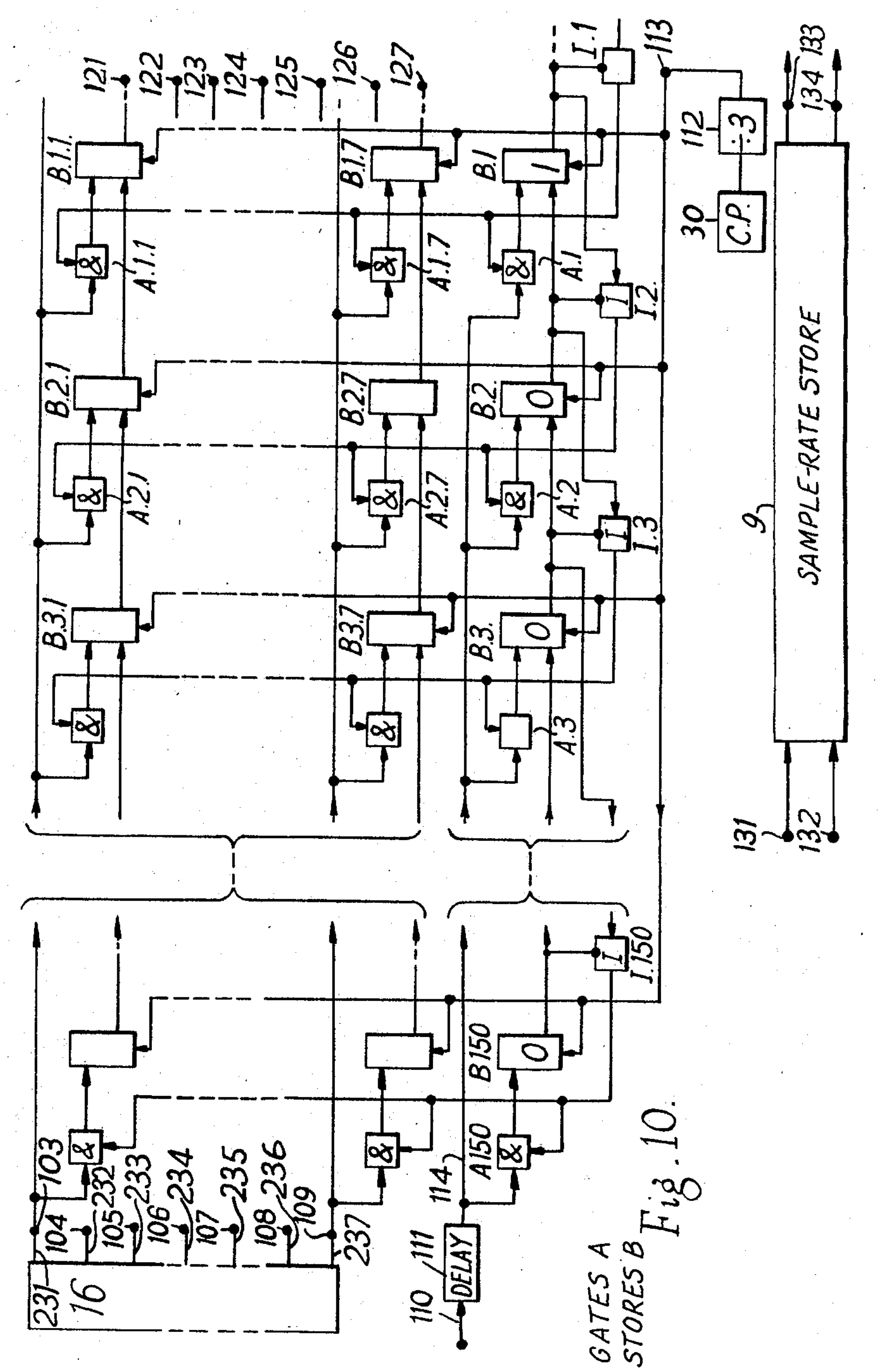

FIG. 10 is a block schematic diagram of the picture sample store 6, switch 7, store-contents unit 8 and supply-rate store 9 of FIG. 1.

FIG. 1 is a greatly-simplified schematic diagram which shows the essential features of the present invention as applied to a television system.

A picture-scanner 1, of conventional form, scans the picture to be transmitted and provides a picture signal of conventional form, that is a voltage signal varying continuously in amplitude according to brightness of the picture-elements scanned. This continuously-varying signal is called an analogue signal.

During periods when picture areas of low-detail are being scanned, the resultant low-detail signals have a small short-term bandwidth. For picture areas of high detail, the corresponding high-detail signal from the scanner may be of several megacycles bandwidth. For the purpose of the embodiments herein, it is assumed that the picture signal from scanner 1 is limited, by low-pass filter or otherwise, to 3 mc./s. bandwidth.

The picture signal is fed from scanner 1 to a combined sampler and analogue-to-digital converter 2.

It is known from theoretical considerations that all the information in a signal of N mc./s bandwidth can be provided by pulses having a pulse repetition frequency of $2N \cdot 10^6$ per second, that is, by pulses spaced by intervals of ½N microsecond, each pulse having the instantaneous amplitude of the original signal. The interval of ½N microsecond is known as the Nyquist interval.

In the present example, the picture signal bandwidth is limited to 3 mc./s. Thus, if the picture signal is replaced by pulses of equivalent amplitude and of pulse repetition frequency $6 \cdot 10^6$ per second, no picture detail is lost during periods of the highest picture detail the picture signal can represent.

The pulse frequency of $6 \cdot 10^6$ per second, that is a pulse interval of ⅙ microsecond, is thus chosen as the constant signal sampling rate of the analogue-to-digital converter 2. In the present example, the picture samples are a succession of binary numbers, identifying the amplitudes thereof.

However, not all of the picture samples, following one another, continuously at the Nyquist interval are required during periods of low picture detail and not all the samples generated are transmitted through the system, therefore.

A small number of successively slower sample rates of transmission are provided for choice when pcture detail is correspondingly lower. In the present system, two alternative slower pulse rates are provided, respectively of ⅓ and ⅑ the sampling rate of the analogue-to-digital converter 2, corresponding to pulse intervals of ½ microsecond and 1½ microseconds, respectively.

As has already been stated, picture samples are generated continuously at the Nyquist interval of ⅙ microsecond by the analogue-to-digital converter 2. The slower sample rates are obtained by selecting from the samples generated those samples which are spaced at the required one of the longer intervals. The intermediate samples are not required and are lost.

All the picture samples generated are supplied from the analogue-to-digital converter 2 to a supply gate 16 by way of a delay unit 17. During periods of high picture detail, the gate 16 is opened coincidently with every sample, at the Nyquist interval, to pass every sample onwards. During periods of lower picture detail, the gate 16 is opened at the selected longer intervals, in a manner now to be explained.

The picture sample output from the analogue-to-digital converter 2 is also supplied to a detail detector 3. The detail detector 3 continuously examines the picture signal samples and identifies periods of high-detail and low-detail in the picture signal. Correspondingly, the detail detector 3 supplies a two-level output signal.

From the high or low detail information supplied by the detail detector 3, a supply rate selector 4 determines the intervals at which the supply gate 16 shall be opened and the output of the supply rate selector 4 is a series of control pulses spaced at the required intervals for opening the supply gate 16.

For the high-detail condition, the highest supply rate is chosen, corresponding tot he Nyquist sampling interval of ⅙ microsecond. For the low-detail condition, a lower supply rate is chosen.

The function of the supply rate selector 4 is to limit the many possible resultant sample supply rates to the three rates chosen for the system, that is the high-detail rate at the Nyquist interval $t$ of ⅙ microsecond, the medium rate at intervals $3t$ and the slow rate at intervals $9t$. The supply rate selector 4 supplies an output control pulse to the supply gate 16 when a signal sample is required.

In the system described more fully below, $2^7=128$ levels of amplitude of the analogue picture signal are identified in binary form by the analogue-to-digital converter 2. The binary information is provided as a seven-bit binary signal supplied in parallel on seven lines. The picture samples are thus supplied to both the detail detector 3 and the supply gate 16 on seven parallel lines. The gate 16 therefore comprises seven parallel gates, one for each line, all operated simultaneously.

The output pulses from the supply rate selector 4 are also supplied to a supply-rate coder 5.

As has been stated above, three sample-rates are possible. The three possible pulse intervals can thus be identified by two binary elements, in other words by a number of two binary digits. Indeed only two binary digits would be needed for a system with four possible pulse-rates.

The sample rate coder provides an output number of two binary digits identifying the interval between consecutive control pulses, that is between consecutive digital picture samples.

It will now be understood that substantially the full information content of the 3 mc./s. picture signal is contained in a succession of unequally spaced picture samples, most of which are spaced by more than the Nyquist interval corresponding to 3 mc./s. bandwidth. Thus, this information can be transmitted by a channel of less than 3 mc./s., provided that the samples are transmitted more uniformly in time than they are generated. The function of the remaining units of the transmitter of the system is to perform such rearrangement in time.

To this end, the digital picture samples are supplied by the supply gate 16 to a picture-sample store 6 and are accumulated or "stacked" in the store until required for transmission. Thus, picture samples are supplied to the store 6 at one of the three supply rates chosen by the supply rate selector 4, as determined by the picture detail, and the samples are extracted from store 6 at a uniform rate for transmission.

Ideally, the extraction rate is the average rate of signal sample supply over a long period. The bandwidth of the transmission channel used is determined by this average sample supply and sample extraction rate.

In the practical system described herein, the sample extraction rate is chosen to be the same as the medium sample supply rate, that is a pulse rate of $2 \cdot 10^6$ per second, the extraction interval then being ½ microsecond.

As will be understood from the fuller description which follows, this enables a single clock-pulse generator to be used for control of both sampling and sample-extraction and otherwise simplifies the storage operation.

The picture-sample store 6 comprises seven parallel channels, to store the digital number of seven binary digits. Each channel has a large number, over one hundred, stages, so that the store has a capacity of over one hundred picture samples at any one time. This capacity is required during periods when picture detail is high and the picture sampling rate exceeds the sample extraction rate. The store 6 thus acts as a reservoir of picture samples.

The store 6 is arranged so that successive picture samples are extracted from one end of the store. As the end store stage is left empty, the numbers in the store are moved forward by one stage to refill the emptied last stage. Each new picture sample is entered into the first available, that is unoccupied, stage of the store.

The arrangement is shown in FIG. 1. For simplicity of the figure, picture store 6 is shown with only sixteen stages and the seven parallel channels, each holding one digit of a 7-bit number, are represented as a single storage channel holding 7-bit numbers. The stages containing a 7-bit number are marked "X." The empty stages are marked "0." The first empty stage is selected by a switch 7. The figure shows the condition immediately after a picture sample has been entered. The position of switch 7 moves to the left preparatory for the next following picture sample and is moved to the right as each sample is extracted. The position setting of switch 7 is determined by a store-content unit 8, described later.

So that the original picture signal can be reconstructed in the receiver 15, each picture sample is identified according to its spacing, as determined by the supply rate selector 4.

It is immaterial whether the spacing is measured from the preceding picture pulse or the next following picture pulse, so long as the system is consistent. In the system described below, the interval is measured from the preceding pulse. This information is coded by the supply-rate coder 5, stored as a 2-bit binary number in a supply-rate store 9, advanced through the store with the corresponding picture sample and extracted from store and transmitted with it. Thus, store 9 has the same number of stages as store 6, stored numbers are advanced stage by stage correspondingly and switch 7 similarly selects the first empty stage of both stores. The stages of store 9 which held a 2-bit sample-rate number are similarly marked "X." Empty stages are marked "0."

It is a feature of the system that a picture sample is made available for transmission at every extraction operation from store. During periods of low picture detail, when the picture sample rate is less than the sample extraction rate, the stores 6 and 9 tend to empty. To prevent this ever happening, extra picture samples are supplied to the store 6 by the supply gate 16 under the control of the supply-rate selector 4 and corresponding extra pulses are supplied to the store 9 by the supply-rate coder 5, also under the control of the supply-rate selector 4.

The contents of stores 6 and 9 are continuously measured by a store-content unit 8. This unit is a third store having the same number of stages as stores 6 and 9. Each store stage has only two conditions, viz. "full" or "empty." This information is shown by a single binary element for each store stage of the store-content unit 8 and the stages are selected by the same switch 7. Full store stages are marked "1" and empty stages marked "0" in FIG. 1.

When the stores 6 and 9 near the empty condition a stage near the end of unit 8 changes from "1" to "0." This change generates an "Underload" signal at terminal 11, which signal is fed to the supply rate selector 4 to override the sample supply rate instruction determined by the low picture detail instead to provide the medium supply rate. Samples then continue to be supplied to store 6 at the sample extraction rate, no matter how low the picture detail.

Conversely, during periods of high picture detail, the picture sample rate exceeds the sample extraction rate and the stores 6 and 9 tend to fill up. Store saturation can be delayed by increasing the store capacity, but this course has obvious limits.

In the system described below, the stores 6 and 9 have 150 stages and the store-content unit 8 indicates when this capacity becomes saturated. When stores 6 and 9 become full, the first stage of unit 8 changes from "0" to "1." This change provides an "Overload" signal at terminal 10. This signal is fed to the supply rate selector 4 to override the supply rate instruction provided by the high picture detail in favour of the medium supply rate. Thereafter, picture samples are supplied to store 6 at the sample extraction rate, no matter how high the picture detail.

With a statistically probable alternation of high, medium and low-detail areas as the picture is scanned, the stores 6 and 9 operate as a true reservoir in the middle region of their capacity, additional samples of low-detail picture areas not being required and omitted samples of high-detail picture areas not being necessary.

While it would be possible to transmit the picture samples and sample rate numbers in digital form, as for example by a transmission channel having nine parallel channels, it is preferred, in this example, to transmit both signals as analogue signals. Accordingly digital-to-analogue converters 12 and 13 are provided for the picture samples and sample rate information respectively.

The two signals are transmitted by two channels separated physically or separated in radio frequency or in time, or by the use of different forms of modulation, as preferred. The necessary techniques are well-known and need not be described. The two channels—which together form transmission channel 14, are referred to herein as the video channel and the position information channel, respectively.

Thus, the output signals from the converters 12 and 13 are fed to a transmission channel 14 of known form. The capacity of channel 14 is fully used by the uniformly transmitted information. This bandwidth of channel 14 is determined by the picture sample extraction rate and by the combined information content of the picture and sample supply rate signals, that is 9-bits.

If solely the picture samples needed to be transmitted, the bandwidth of channel 14 would be ⅓ that of a conventional channel used to transmit the original 3 mc./s. picture signal.

As the read-out rate of supply-rate numbers and the read-out rate of picture samples is the same, the video and position channels may require the same bandwidth. As the sample rate number represents less data than the picture sample, this position information signal may be recoded, to occupy a correspondingly smaller bandwidth, using multiple-level amplitude modulating encoding. The unit for such recoding is not shown in the simplified diagram of FIG. 1.

Both signals are fed by channel 14 to receiver 15. The receiver 15 receives both the compressed video signal and the sample supply rate information at the uniform rate at which they are transmitted. It reconstitutes the picture by use of variable velocity scanning, the video signal being used to control the brightness of the scanning spot and the supply rate information being used to control its velocity.

Additionally, picture frame and line synchronising information must be transmitted to the receiver and at least one sound channel provided. These again follow well-established techniques and the present invention is not concerned with the form taken by these parts of an overall television system.

Having outlined the general form and manner of operation of a television transmission system according to the invention, the individual units of the system will now be described more fully.

*Picture scanner*

The picture scanner 1 may be of conventional form, such as a camera tube or film scanner. The line number and frame frequency standard is immaterial to the system, except that it is assumed that the instantaneous bandwidth of the picture signal is limited to 3 mc./s., for example by a low-pass filter, and that adequate definition for the system is provided in this bandwidth. The figure of 3 mc./s. is assumed for convenience of the following description and corresponds to the figure which applies to the British 405 line television system.

Line and frame synchronising information are derived from the scanning circuits associated with the picture scanner so that the receiver picture tube can be synchronised in the conventional manner.

Figures 2A, 2B, 2C, 2D, 2E, 2F:
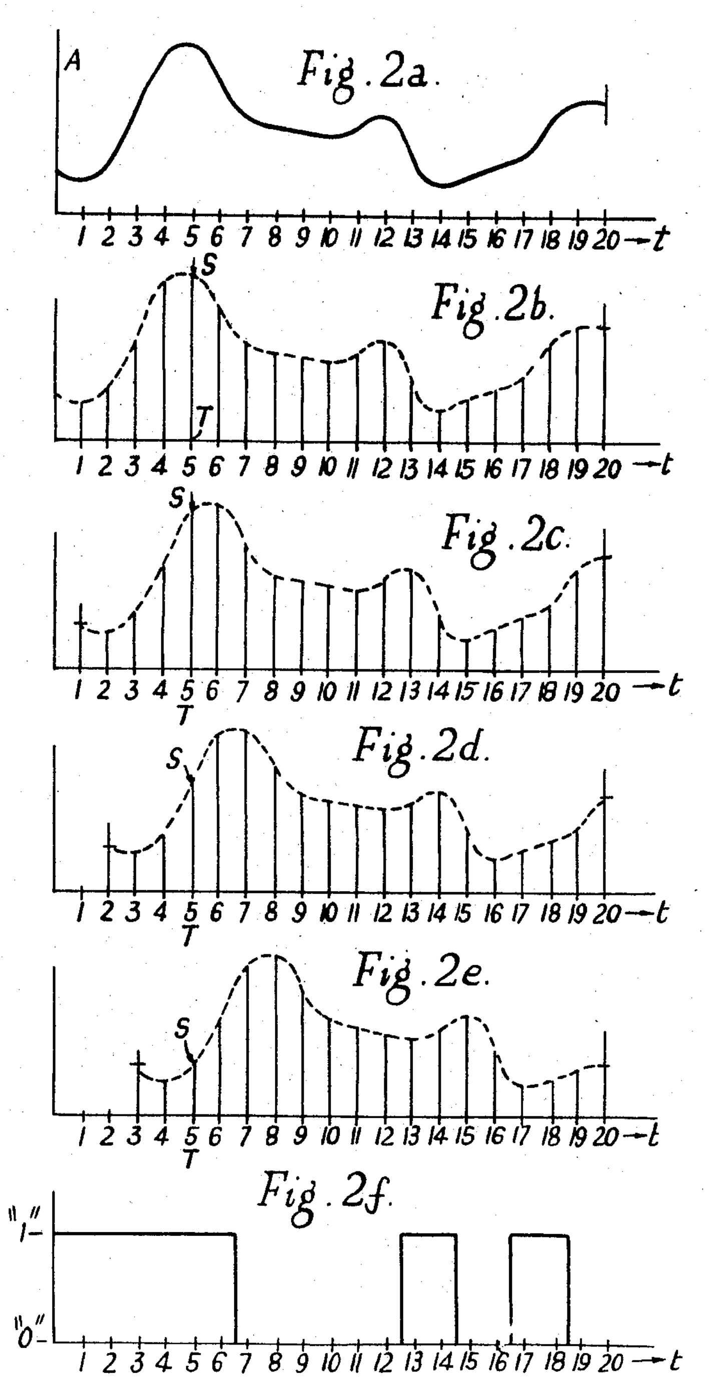

The picture signal provided by picture scanner 1, is represented diagrammatically in FIG. 2*a*, where the horizontal axis represents successive intervals of time of ⅙ microsecond increasing in the direction of the arrow *t* and the arrow A represents signal amplitude.

*Signal sampler and analogue-to-digital converter*

Figure 3:
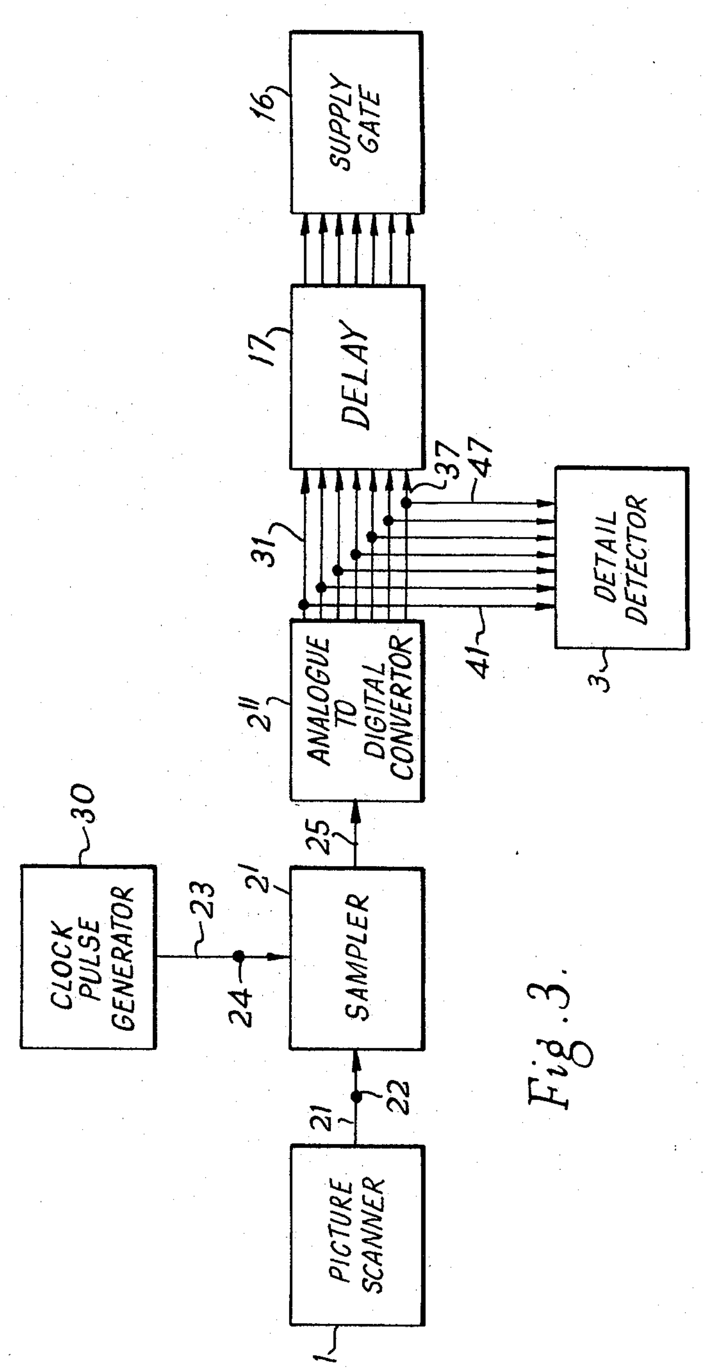
FIG. 3 is a block schematic diagram of the sampler and analogue-to-digital converter 2 of FIG. 1.

The signal sampler and analogue-to-digital converter 2 of FIG. 1 is shown again in FIG. 3 with certain associated units. In FIG. 3, the unit is shown as a separate sampler 2′ and analogue-to-digital converter 2″.

The sampler 2′ has the picture signal analogue waveform of FIG. 2*a* supplied from the scanner, shown as box 1, by line 21 to one input terminal 22. Pulses, at the Nyquist interval *t*, are supplied from a clock pulse generator 30 by line 23 to the other input terminal of the sampler 2′. For each pulse from the clock pulse generator 30, the sampler 2′ provides an output pulse on line 25 of amplitude corresponding to the instantaneous amplitude of the waveform of FIG. 2*a*. The resultant amplitude modulated pulses are shown in FIG. 2*b*, where the base numerals 1 to 20 indicate successive pulse times at intervals *t* and the dotted outline shows the amplitude of the original analogue waveform.

The apparatus required for the sampler 2′ is known and may, for example, be of the form described by Chance et al. in "Waveforms" and by Millman and Taub in "Pulse and Digital Circuits."

The amplitude of each pulse of the waveform of FIG. 2*b* is evaluated as a 7-bit binary number by the analogue-to-digital conveter 2″ and this binary number is supplied in parallel at seven output terminals. These seven terminals are connected by seven lines 31 to 37 inclusive, of which only lines 31 and 37 are referenced in FIG. 3, to the supply gate, shown as box 16, by way of a seven channel delay unit, shown as box 17. The output terminals are also connected by lines 41 to 47 inclusive, of which only lines 41 to 47 are referenced in FIG. 3, to the detail detector, shown as box 3.

The analogue-to-digital converter 2″ may comprise a coding tube such as that described by Sears in the "Bell System Technical Journal," January 1948, page 44, or any other suitable analogue-to-digital converting means.

*Detail detector*

The function of the detail detector 3 is continuously to examine a sequence of consecutive picture samples from the analogue-to-digital converter 2″ of FIG. 3 the sequence of samples examined itself progressing continuously and, by examination of the changing amplitudes of the sequence of samples, as represented by the binary numbers representing the sample amplitudes, thereby to define the detail of the picture signal as high-detail or low-detail and to supply an output control signal accordingly.

Since the picture sample input data are binary numbers, this operation will be recognised as a logical operation of the general type which is common in digital computing circuit arrangements.

Theoretically, the detail detector may be designed to examine any number of consecutive picture samples. In the embodiment now to be described by way of explanation, four consecutive picture samples are examined.

As explained with reference to FIG. 3, the analogue, picture signal waveform of FIG. 2*a* is converted by the sampler 2′ to the amplitude-varying pulse form of FIG. 2*b* and the pulse samples are then converted to binary form by the analogue-to-digital converter 2″.

The following table shows in nine columns respectively the pulse number shown in FIG. 2*b*, the relative decimal amplitude of the pulse and the 7th to 1st binary digit value of the corresponding 7-bit binary number:

| Pulse Number | Relative Amplitude | Binary Digit | | | | | | |
|---|---|---|---|---|---|---|---|---|
| | | 7 | 6 | 5 | 4 | 3 | 2 | 1 |
| 0 | 21 | 0 | 0 | 1 | 0 | 1 | 0 | 1 |
| 1 | 16 | 0 | 0 | 1 | 0 | 0 | 0 | 0 |
| 2 | 24 | 0 | 0 | 1 | 1 | 0 | 0 | 0 |
| 3 | 45 | 0 | 1 | 0 | 1 | 1 | 0 | 1 |
| 4 | 70 | 1 | 0 | 0 | 0 | 1 | 1 | 0 |
| 5 | 74 | 1 | 0 | 0 | 1 | 0 | 1 | 0 |
| 6 | 59 | 0 | 1 | 1 | 1 | 0 | 1 | 1 |
| 7 | 44 | 0 | 1 | 0 | 1 | 1 | 0 | 0 |
| 8 | 39 | 0 | 1 | 0 | 0 | 1 | 1 | 1 |
| 9 | 36 | 0 | 1 | 0 | 0 | 1 | 0 | 0 |
| 10 | 35 | 0 | 1 | 0 | 0 | 0 | 1 | 1 |
| 11 | 39 | 0 | 1 | 0 | 0 | 1 | 1 | 1 |
| 12 | 45 | 0 | 1 | 0 | 1 | 1 | 0 | 1 |
| 13 | 27 | 0 | 0 | 1 | 1 | 0 | 1 | 1 |
| 14 | 14 | 0 | 0 | 0 | 1 | 1 | 1 | 0 |
| 15 | 20 | 0 | 0 | 1 | 0 | 1 | 0 | 0 |
| 16 | 24 | 0 | 0 | 1 | 1 | 0 | 0 | 0 |
| 17 | 28 | 0 | 0 | 1 | 1 | 1 | 0 | 0 |
| 18 | 44 | 0 | 1 | 0 | 1 | 1 | 0 | 0 |
| 19 | 51 | 0 | 1 | 1 | 0 | 0 | 1 | 1 |
| 20 | 52 | 0 | 1 | 1 | 0 | 1 | 0 | 0 |

In the following explanation of the detail detector 3, shown in FIG. 4, the waveforms of FIGS. 2*b* to 2*e* will be referred to. Although the relative amplitudes are indicated in the figures by pulse height, for convenience, it must be remembered throughout that each picture sample is in 7-bit binary form, according to the above table.

Figure 4:
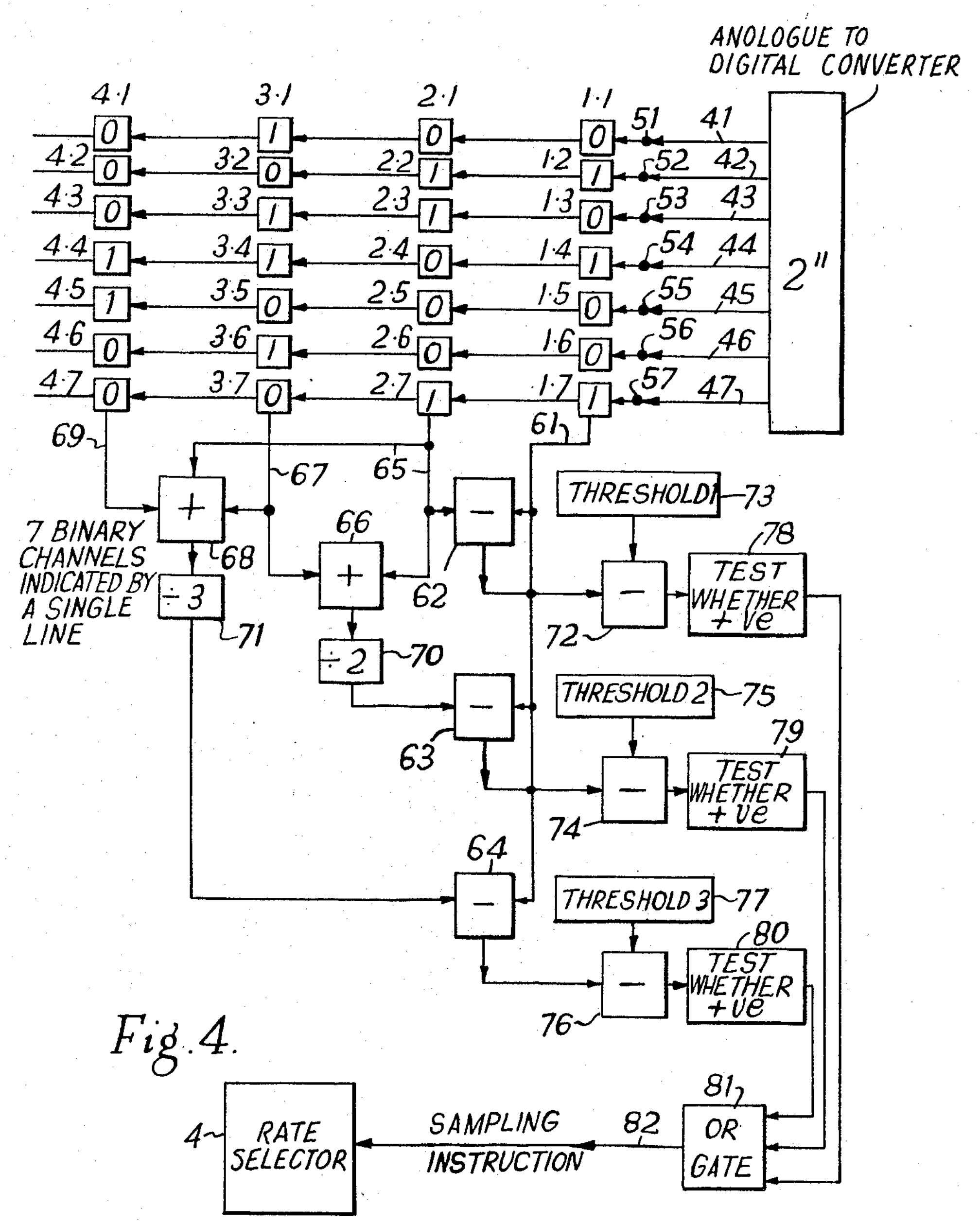
FIG. 4 is a block schematic diagram of the detail detector 3 of FIG. 1.

As shown in FIG. 4, the seven output lines 41 to 47 inclusive of the analogue-to-digital converter 2″ of FIG. 3 are connected to seven input terminals 51 to 57 inclusive of the detail detector. Each input terminal supplies the first stage, 1.1 to 1.7 inclusive, of a 7-bit, 4-stage shift register. Assuming pulse 0 of FIG. 2*b* now to be entered in the shift register, the storage elements 1.1 to 1.7 are in the state: "1.0.1.0.1.0.0." respectively, the reverse sequence to that of the table above.

Figure 5:
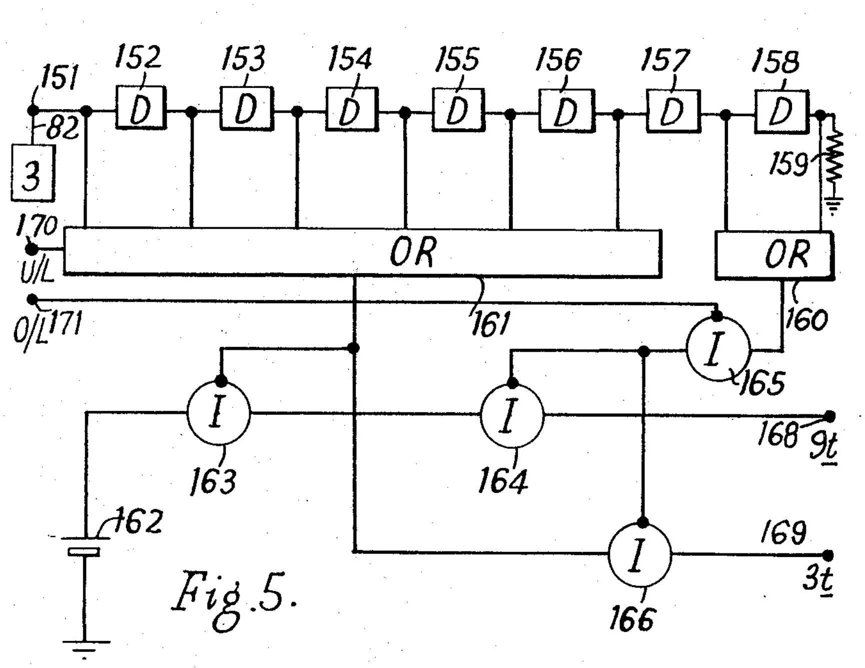
FIG. 5 is a block schematic diagram of the first part of the supply rate selector 4 of FIG. 1.

By the supply of shift pulses derived from the clock pulse generator 30 of FIG. 5, by circuit means not shown, the picture samples are shifted progressively through the four stages of the shift register at the rate the samples are generated, that is $6.10^6$ samples per second.

At corresponding times, represented by the base numerals, the picture sample sequence appearing in the 1st, 2nd, 3rd and 4th stages respectively of the shift register is as shown in FIG. 2*b*, FIG. 2*c*, FIG. 2*d* and FIG. 2*e* respectively.

Considering, then, the instant $t=5$, when the picture sample No. 2 of the table has just been entered into the 4th stage of the shift register, the 3rd, 2nd and 1st stages respectively hold the picture samples Nos. 3, 4 and 5 of the table. The state of the storage elements of the shift register is therefore as follows:

| | | |
|---|---|---|
| 4.1 to 4.7. | 0.0.0.1.1.0.0. | Sample 2=24 |
| 3.1 to 3.7. | 1.0.1.1.0.1.0. | Sample 3=45 |
| 2.1 to 2.7. | 0.1.1.0.0.0.1. | Sample 4=70 |
| 1.1 to 1.7 | 0.1.0.1.0.0.1. | Sample 5=74 |

The instant $t=5$ is shown by the letter "T" in FIGS. 2*b* to 2*e* and the picture sample by the letter "S." The shift register of FIG. 4 is shown in the stage of the storage elements at this instant.

The contents of shift register stage 1 are supplied by a seven parallel channel line 61 to difference units 62, 63 and 64. The contents of stage 2 are supplied by 7-way line 65 to difference unit 62 and to adders 66 and 68. The contents of stage 3 are supplied by 7-way line 67 to adders 66 and 68. The contents of stage 4 are supplied by 7-way line 69 to adder 68.

Difference unit 62 compares the value of the sample in stage 1 with the value of the sample in stage 2 (sample 5 and sample 4). The difference may be either positive or negative, but the sign is ignored and only the modulus of the difference is considered. This difference is represented in this instance by 0 0 0 0 1 0 0. The difference value is supplied to a difference unit 72 and is compared with a standard threshold value generated continuously by Threshold 1 unit 73. Difference unit 72 subtracts the threshold value from the incoming difference value. Unit 78 tests whether the difference is positive; if so, an output signal is supplied to an OR gate 81.

The operation performed is:

(Sample in stage 1∼sample in stage 2)—
Threshold 1=1, if positive
=0, if not positive Adder 66 simultaneously adds the values of the samples in stages 1 and 2. The sum is always positive, in this instance represented "0 1 1 1 0 0 1 1." It will be seen that the sum is an 8-bit number. The sum is fed to a ÷2 divider 70 which derives the half value, represented in this instance "0 1 1 1 0 0 1" a 7-bit number. That is, divider 70 merely shifts all digits one order lower. The half-value is supplied to difference unit 63 which compares the half value with the value of the sample in stage 1. The modulus of the difference, ignoring sign, is represented in this instance "0 0 1 0 0 1." This difference is supplied to difference unit 74, which subtracts a second threshold value generated continuously by Threshold 2 unit 75. Unit 79 tests whether the difference is positive; if so, an output signal is supplied to the OR gate 81.

The operation performed is:

[½ (sample in stage 3+sample in stage 2)∼sample in stage 1]—
Threshold 2=1, if positive
=0, if not positive Adder 68 simultaneously adds together the values of the samples in stages 4, 3 and 2. The sum is always positive, a 9-bit number, in this instance represented "0 1 0 0 0 1 0 1 1." The sum is fed to a ÷3 divider 71 which derives the one-third value, represented in this instance by the 7-bit number "0 1 0 1 1 1 0." This one-third value is supplied to a difference unit 64 which compares the one-third value with the value of sample 5. The modulus of the difference is represented in this instance "0 0 1 1 1 0 0." This difference is supplied to difference unit 76, which subtracts a third threshold value generated continuously by Threshold 3 unit 77. Unit 80 tests whether the difference is positive; if so, an output signal is supplied to the OR gate 81.

The operation performed is:

[⅓ (sample in stage 4+sample in stage 3+sample in stage 2)∼sample in stage 1]—
Threshold 3=1, if positive
=0, if not positive The OR gate 81 enabled by a signal from any one of the units 78, 79 and 80 and therefore supplies a signal on line 82 to the supply rate selector indicated by box 4.

The signal on line 82 is therefore a two-level signal, of value "1," indicating high picture detail, or of value "0," indicating low picture detail, as shown in FIG. 2*f*.

*Supply-rate selector*

The function of the supply-rate selector 4 is to take the signal waveform of FIG. 2*f*, provided by the detail detector 3 and interpret this detail information to instruct the supply gate 16 to supply picture samples of FIG. 2*b* at one of the three chosen sample supply intervals *t*, the Nyquist interval of ⅙ microsecond, 3*t* or 9*t*.

The supply-rate selector is arranged so that if the waveform of FIG. 2*f* were continuously of value "1," sample supply to store 6 at intervals *t* would be continuously instructed, whereas, if the waveform were continuously of value "0," sample supply at intervals of 9*t* would be continuously instructed.

As neither of the values "1" or "0" can be steady state values during transmission of a picture, the supply rate selector operates to evaluate the duration of each "0" gap between "1" blocks and to fill the "0" gap exactly with samples at intervals $9t$, $3t$ or $t$, as necessary. A gap of duration between $3t$ and $9t$ is filled by one or by two samples at interval $3t$ and the remaining part of the gap by samples at intervals $t$. A gap of duration greater than $9t$ is filled by the greatest possible number of samples at intervals $9t$. The remaining part of the gap is filled by samples of intervals $3t$ and $t$, as required. In this way picture sample supply to the store 6 is limited to the three sample supply rates corresponding to the three intervals stated.

Figure 6:
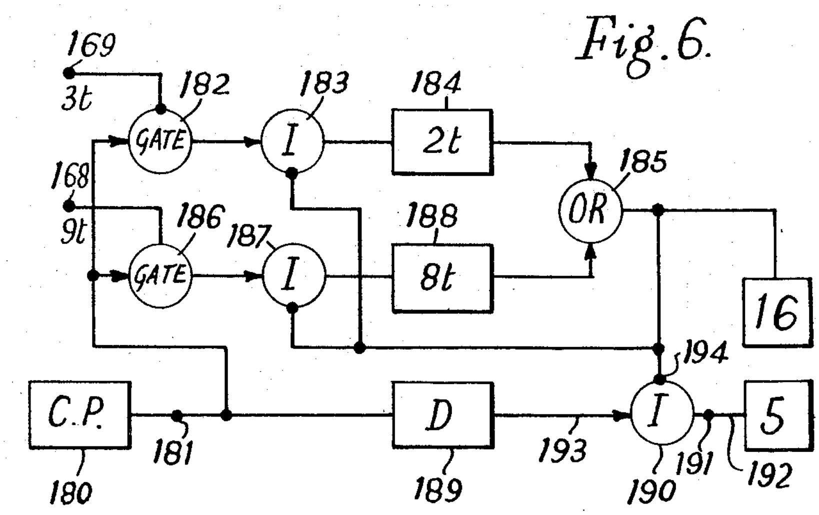
FIG. 6 is a similar diagram of the second part thereof.

The supply-rate selector 2 is shown in two parts in FIGS. 5 and 6, the output terminals 168, 169 of FIG. 5 appearing as input terminals in FIG. 6. It will be noted that the two terminals are inverted in FIG. 6, for convenience. The part of FIG. 5 operates as a translator of the signal of FIG. $2f$ and the part of FIG. 6 operates as a gating unit.

The output signal from the detail detector, represented by box 3 in FIG. 5, is fed by line 82 to input terminal 151 of the translator unit and thence to a tapped delay line, comprising seven equal delay elements 152 to 158 inclusive, terminated in its characteristic impedance 159. Each delay element 152 to 158 introduces an equal delay D of the Nyquist interval of ⅙ microsecond.

The output of the delay line 152–158 and the tap between elements 157, 158 are connected to the two inputs of an OR gate 160. The input terminal 151 and the taps between successive pairs of delay elements 152 to 157 are connected to the six inputs of an OR gate 161.

If an "0" level gap in the FIG. $2f$ waveform is equal to or greater than an interval $8t$, the total delay of the delay line 152–158, no signal exists at any point in the delay line and neither OR gate 160, 161 has an output.

A signal from bias source 162 passes through inhibit gate 163 and inhibit gate 164 to terminal 168 to instruct sampling at the slow rate with interval $9t$, as will be shown with reference to FIG. 6.

When a "1" level signal enters the delay line 152–158 at terminal 151, an output from OR gate 161, marks the inhibit terminal of inhibit gate 163 to de-energize $9t$ terminal 168. At the same time, the output from OR gate 161 passes inhibit gate 166 to energize terminal 169. This instructs sampling at the medium rate with interval $3t$, as will be shown with reference to FIG. 6.

Unless a "0" level gap exceeds an interval $5t$, one or more inputs to OR gate 161 are supplied with a signal, the $9t$ terminal 168 is de-energized and the $3t$ terminal 169 is energized. Thus, at the end of an interval equal to or less than $8t$ from the front of a "1" level signal entering the delay line, sampling at intervals $9t$ ceases and sampling at intervals $3t$ commences.

When a "1" level signal is at the input end or output end of delay element 158, OR gate 160 receives an input and supplies an output signal, through inhibit gate 165, to the inhibit terminals of both inhibit gates 164 and 166. Both terminals 168 and 169 are de-energized thereby. Sampling at both intervals $9t$ and $3t$ is inhibited in favour of sampling at interval $t$.

Underload and overload signal inputs are supplied to terminals 170 and 171 respectively. As previously explained, signal samples are stored and extracted from store at uniform intervals $3t$. With sampling at intervals $3t$, the store can either fill nor empty. An underload signal originates when sampling occurs at intervals $9t$ for a prolonged period, so that the store empties.

An underload signal to terminals 170 is supplied to OR gate 161 to energise $3t$ terminal 169 and de-energise $9t$ terminal 168. Alternatively, sampling at interval $t$ is permitted if an output from OR gate 160 de-energises $3t$ terminal 169.

An overload signal originates when sampling occurs at intervals $t$ for a prolonged period. An overload signal to terminal 171 is supplied to the inhibit terminal of inhibit gate 165 to inhibit the signal from OR gate 160 which would otherwise de-energise both terminals 168 and 169. The $3t$ terminal 169 or the $9t$ terminal 168 is then energised depending whether there is or is not an output signal from OR gate 161.

Considering now the gating unit of FIG. 6, pulses at interval $t$ are supplied from the clock pulse generator 30 of FIG. 3 to terminal 181. If neither $3t$ terminal 169 nor $9t$ terminal 168 is energized, the clock pulses are supplied continuously through delay element 189, inhibit gate 190, output terminal 191 and by way of line 192 to the supply-rate coder unit 5, represented in FIG. 6 by the box 5.

Clock pulses are also supplied to gates 182 and 186, which gates are closed in the absence of a signal to the terminals 169 and 168, respectively. If $3t$ terminal 169 is energised, gate 182 is opened to pass clock pulses, by way of inhibit gate 183, to a monostable generator 184 which generates pulses of duration $2t$. These $2t$ pulses are supplied by way of OR gate 185 and output terminal 185′ to the sample supply gate 16 represented in FIG. 6 by the box 16. The $2t$ pulses are also supplied to the inhibit terminal of inhibit gate 190 and serve to block out two clock pulses in each sequence of three. The output pulses at terminal 191 are the residual clock pulses at interval $3t$.

If $9t$ terminal 168 is energised, gate 186 is opened to supply clock pulses by way of inhibit gate 187 to a monostable generator 188 which generates pulses of duration $8t$. These $8t$ pulses are supplied by way of OR gate 185 and output terminal 185′ to the sample supply gate 16. The $8t$ pulses are also supplied to the inhibit terminal of inhibit gate 190 and serve to block out eight clock pulses in each sequence of nine. The output pulses at terminal 191 are the residual clock pulses at interval $9t$.

Either pulses of duration $2t$ or $8t$ from generator 184 or 188 respectively inhibits both inhibit gates 183 and 187 for the duration of the respective pulse. This prevents either generator 184 or 188 being triggered by an incoming clock pulse while an output pulse is being generated.

The delay 189 corresponds to one half the clock pulse interval, that is ½$t$. This ensure that the $2t$ and $8t$ inhibit pulses overlap the two or eight clock pulses to be blocked out.

Figure 7:
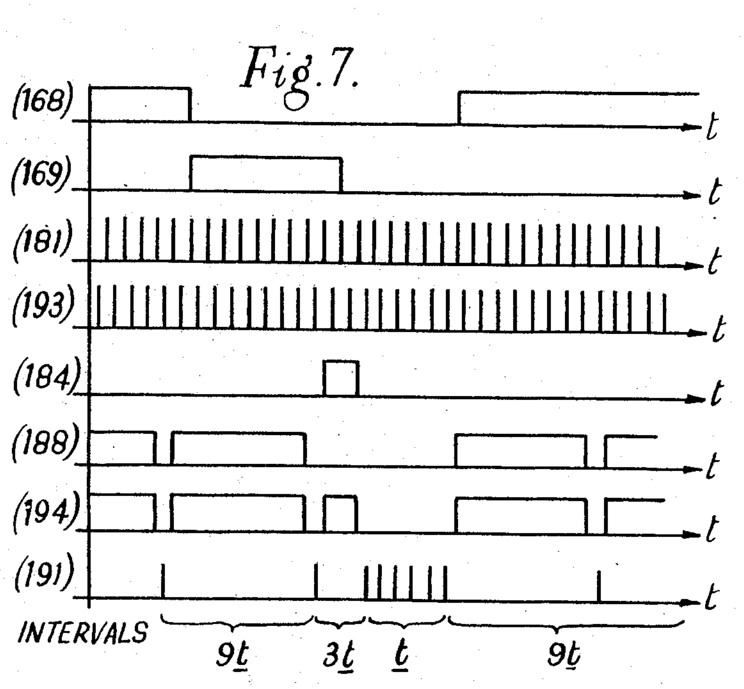
FIG. 7 shows a series of pulse/time diagrams representing signals at various points of the circuits of FIGS. 5 and 6.

FIG. 7 is a signal/time diagram showing typical signals at various points of the gating circuit of FIG. 6. The numeral references in brackets at the left-hand side of each waveform correspond to the terminal or element references in FIG. 6 at which the waveform appears. For the purpose of FIG. 7, the input line of inhibit gate 190 is referenced 193 and the inhibit terminal 194.

*Supply-rate coder*

The supply-rate coder operates to ascertain the sample-rate according to the pulse waveform of FIG. 7 (191). This can be only the high, medium or low rate corresponding to the pulse intervals $t$, $3t$, and $9t$ respectively. The three possibilities are coded as a two-bit binary number on two parallel channels.

Figure 8:
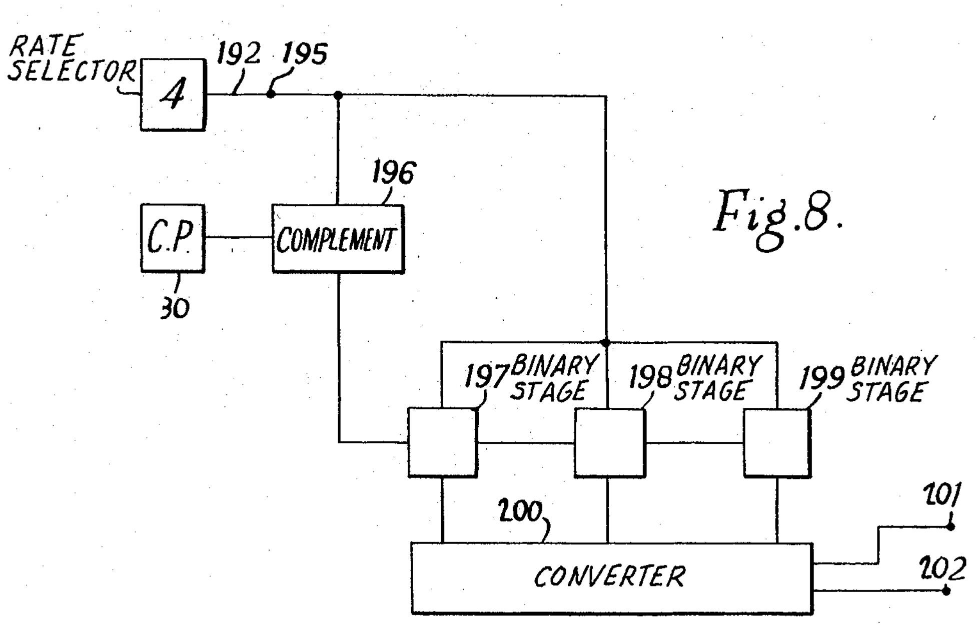
FIG. 8 is a block schematic diagram of the supply-rate coder 5 of FIG. 1.

The supply-rate coder is shown more fully in FIG. 8. The pulse waveform of FIG. 7 (191) on line 192 is supplied to input terminal 195 and thence to a complement unit 196 and a counter of three binary stages 197, 198 and 199. The complement unit is also supplied with clock pulses from the clock pulse generator 30, so that it generates the complement of the input waveform of FIG. 7 (191). In other words, the complement unit 196 fills in the intervals between sample pulses with clock pulses. According to the sample supply-rate, the intervals may contain eight, two or zero clock pulses. These pulses are fed to the counter 197, 198, 199 which counts the input pulses in sequence, being reset by each sample pulse at terminal 195. The state of counter 197, 198, 199 at each reset operation is detected by converter 200 which supplies the corresponding one of three 2-bit binary numbers at terminals 201 and 202.

*Picture sample supply gate*

The picture sample supply gate 16 is an arrangement of seven conventional inhibit gates supplied in parallel and operated simultaneously.

Figure 9:
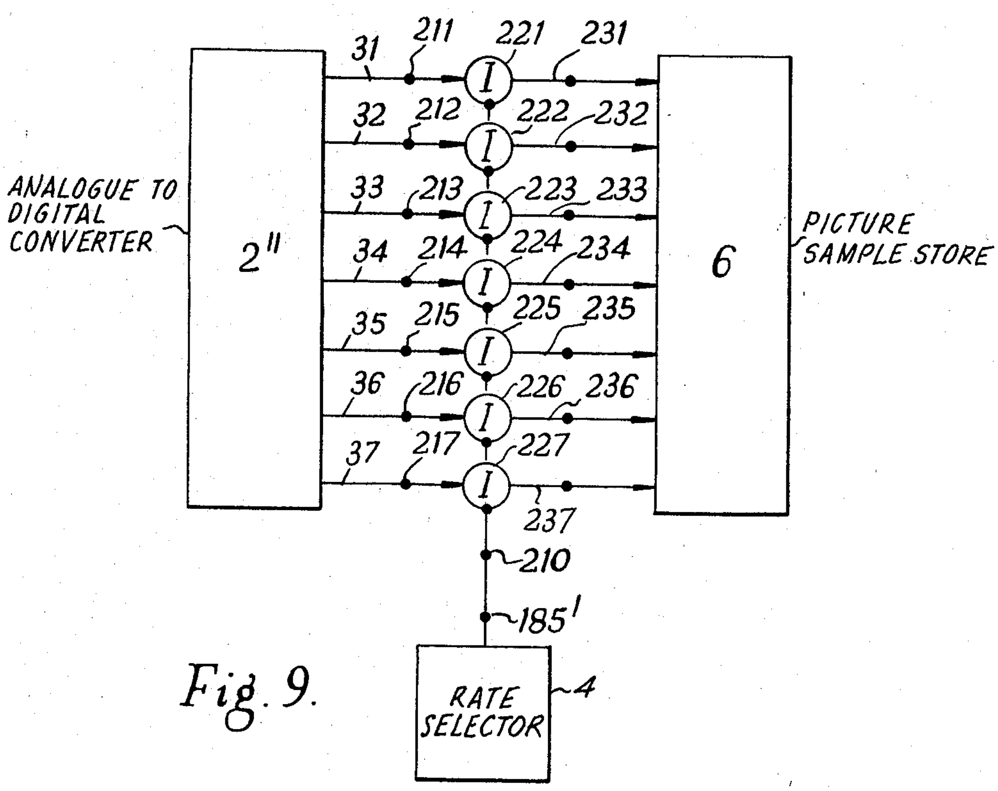
FIG. 9 is a block schematic diagram of the supply gate 16 of FIG. 1.

As shown in FIG. 9, the 7-bit binary picture samples from the analogue-to-digital unit 2″ of FIG. 3, appearing on lines 31 to 37 inclusive, are supplied to seven input terminals 211 to 217 inclusive of the seven parallel inhibit gates 221 and 227 inclusive.

Control pulses from the supply rate selector 4 of FIGS. 5 and 6, derived from the OR gate 185 and appearing at the output terminal 185′, are supplied to control terminal 210, which is connected to the inhibit terminal of all the gates 221 to 227 inclusive.

Each absence of inhibit pulse at terminal 210 causes a digital picture sample present at terminals 211 to 217 inclusive to pass to output lines 321 to 237 inclusive and thence to the seven input terminals of the picture sample store, indicated by box 6.

*Picture sample store*

The digital number representing picture-sample amplitude is a 7-bit binary number supplied at the seven parallel output lines 231 to 237 inclusive of supply gate 16.

The picture-sample store correspondingly comprises seven channels and has, in this particular example, 150 stages. Picture samples are "stacked" in the store at the sample supply-rate determined by unit 4 and withdrawn at uniform extraction intervals 3*t*.

In this embodiment of the store, samples are always extracted from the end stage. Thus the logic of the store circuitry is required to shift forward the sample contents of the store at each extraction operation and enter each new sample into the first available empty stage at each sample operation.

The store 6, switch 7 and store 8 of FIG. 1 are shown more fully in FIG. 10. The 7-bit picture samples from gate 16 are supplied to seven terminals 103 to 109. For simplicity of the figure, only the two channels from terminals 103 and 109 are shown and only the first stage and the final three stages are shown.

Each parallel line 103 to 109 extends through the store and is connected to all 150 stages of the corresponding channel.

The store-content unit 8 comprises a single channel only, as it stores binary information, the single channel being supplied with the pulses of FIG. 7 (191) at terminal 110 by way of delay 111.

Shift of the samples through the store, stage by stage, and extraction of the sample in the end stage are performed simultaneously by shift pulses at interval 3*t* supplied at terminal 113. These are derived from the clock pulse generator 30 by way of ÷3 divider 112. Switching of the sample input to the correct stage of store 6 is controlled by unit 8.

The unit 8 comprises an input line 114 from delay 111 which runs to all 150 stages of the unit. Each stage contains an AND gate A, a binary store B and an inhibit gate I suffixed in FIG. 10 according to the number of the stage counting from the end of the unit.

For the purpose of describing FIG. 10, it is assumed that store B.1 is in state "1," that is full, while stores B.2 to B.150 are in state "0," that is empty. This state provides an output from inhibit gate I.2, which prepares the AND gate A.2 of unit 8 and similarly the seven AND gates A.2.1 to A.2.7 of store 6. The next incoming picture sample is therefore entered into the binary storage elements B.2.1 to B.2.7 of store 6.

Solely the AND gates of stage 2 have been prepared, so that the same picture sample, although appearing at the input terminals of all other stages, is entered solely into stage 2.

Immediately after entry of the sample into store, a delayed pulse from store B.2 flows through inhibit gate I.3 to prepare AND gate A.3 and similarly AND gates A.3.1 to A.3.7 of store 6. The next picture sample is then entered into stores B.3.1 to B.3.7. In the same way, the next following sample is entered into stores B.4.1 to B.4.7.

The foregoing description has assumed picture sampling at intervals *t*, so that three samples are stored for the extraction of one sample. The next operation, therefore, is the extraction of a sample from store 6.

A shift pulse at terminal 113 shifts the number stored in each of the stages 3 and 2 into the next lower numbered stage. Thus the state of store element B.3.1 is transferred to store element B.2.1 while the state of B.2.1 is transferred to store element B.1.1. The state of B.1.1 is omitted as a signal of level "1" or level "0" corresponding. Thus the sample in store elements B.1.1 to B.1.7 is omitted as a 7-bit binary number identical to the form in which it was entered. This output sample appears at terminals 121 to 127.

At the bottom of FIG. 10 is shown a box 9 which represents the sample-rate store 9 of FIG. 1. This store is identical in form to picture-sample store 6, except that it holds only a two-bit number and therefore has two channels instead of seven. It similarly has 150 stages.

The two AND gates of stage 1 have inputs in parallel with AND gates A.1 and A.1.1 to A.1.7 so that they are prepared coincidently therewith, and similarly for stages 2 to 150. Shift pulses from terminal 113 are similarly supplied to all the binary storage elements of store 9. Sample-rate code numbers are entered into store 9 and extracted therefrom coincidently with the corresponding picture samples from store 6.

Store 9 of FIG. 10 is thus shown with two input terminals 131 and 132, which are supplied from sample supply-rate coder 5, and two output terminals 133 and 134, which supply converter 13.

*Digital-to-analogue converter*

The digital-to-analogue converters 12 and 13 are of known form, such as that described by Sears in Bell System Technical Journal, January 1948, page 44. Converter 12 has seven input terminals to which the 7-bit picture sample is supplied in parallel when extracted from the last stage of the picture-sample store 6. This converter supplies a voltage output signal having one of 128 discrete amplitudes, corresponding to the magnitude of the 7-bit sample number. This output signal occurs as a pulse at the extraction interval of 3*t*. This pulse signal is fed through a low-pass filter, not shown, to the video line of channel 14.

Digital-to-analogue converter 13 correspondingly has two input terminals and provides an output signal having one of three discrete amplitude levels, according to the sample-rate. This signal is similarly a pulse signal at the extraction interval 3*t*.

For simplicity in the present explanation, it will be assumed that this pulse signal is similarly fed by way of a lowpass filter, not shown, to the "position" line of channel 14. In practice, the signal is preferably recorded to occupy a bandwidth corresponding to its small information content.

*Receiver*

The receiver 15 has picture tube supply and scanning circuits, in known manner. It has two inputs to which the video and "position" signals are supplied, respectively.

The video signal is amplified and supplied to the control electrode of the picture tube in conventional manner. The position signal controls the line scan circuits so that the high sample-rate signal reduces the line scan speed to one-third that for the medium scan rate. The low sample-rate signal increases the line scan to three times that for the medium scan rate. The resultant effect is to compensate by a variable scanning rate for the fact that picture samples taken non-uniformly in time are transmitted uniformly in time. A brightness compensation signal is required by the receiver in order to compensate for the varying picture brightness which would otherwise result from variable velocity scanning of the receiver picture tube. A brightness control signal is derived directly from the "position" signal. In this way, the original picture is reproduced on the receiver picture tube.

A suitable circuit arrangement for the purpose described above is that described in British Patent No. 858,346, with reference to FIG. 3 of the complete specification thereof.

What we claim is:

1. A signal transmission system having a transmission channel, a source of an information signal, a detail content detector unit for estimating the detail content of picture samples in digital form continuously and for providing a corresponding detail level signal, an analogue-to-digital converter supplied with the information signal to provide an evaluation of the information signal amplitude in digital form at discrete sampling instants, the interval between any two consecutive sampling instants being chosen as the shortest one from a plurality of predetermined sampling intervals, a first multi-stage store for storing information about the samples of the information signal amplitude, means for supplying to the first store selected digital information signal samples at any one of said plurality of predetermined sample intervals, the sample intervals between information samples supplied to the first store defining a plurality of predetermined sample supply rates, the choice of sample supply rate being determined by the detail level signal means for extracting from the first store said information about said samples at a first extraction rate, means for supplying said information about said samples, extracted from the first store, to said transmission channel, a second multi-stage store for storing information about the sample supply rate defining the intervals between successive samples of the information signal, means for supplying information about the sample rate to the second multi-stage store, means for extracting from the second store the information stored therein at a second extraction rate, means for supplying the information extracted from the second store to the transmission channel, and means at the output of the transmission channel for respacing the information signal samples according to the sample supply rate information, a storage content unit for continuously examining the number of samples contained in the first store and providing an overload and an underload signal, respectively, as the first store becomes full or becomes empty, said overload and underload signal being effective to over-ride the sample supply rate and to choose a signal sampling rate equal to or less than the sample extraction rate in the case of the overload signal and a signal sampling rate equal to or greater than the sample extraction rate in the case of the underload signal.

2. A system according to claim 1 wherein the second extraction rate is equal to the first extraction rate.

3. A system according to claim 1 wherein a sampling unit controlled by the detail level signal is connected to the analogue-to-digital converter supplied with the information to provide an evaluation of the information signal amplitude in digital form at the discrete sampling instants, so that the samples are stored in the first store in digital form and are supplied to the transmission channel in a given form; a sample rate coder being provided in the system for supplying the sample supply rate information in digital form for storing in the second store, so that the sample supply rate information is supplied to the transmission channel in a given form.

4. A system according to claim 1 in which said shortest one of said plurality of sampling intervals is substantially related to the bandwidth of high detail signals in the following manner: when the said signal bandwidth is N megacycles per second, said shortest sampling interval is ½ N microsecond.

5. A system according to claim 1 in which the detail detector unit estimates the detail content of the information signal according to one or the other of two detail levels and provides correspondingly a detail level signal having one or the other of two values.

6. A system according to claim 1 in which the analogue-to-digital converter provides evaluation of the information signals in parallel binary form as binary signals on a plurality of parallel lines, said parallel lines being connected to supply said detail detector unit.

7. A system according to claim 1 having an odd numbered plurality of the predetermined sampling intervals, in which the predetermined sample extraction rate from the first multi-stage store is the same as the sample supply rate corresponding to the middle one of said odd numbered plurality of sampling intervals.

8. A system according to claim 1 in which the storage content unit includes a multi-stage store having binary stages and having the same number of stages as the multi-stage store, means for switching each binary stage to one state corresponding to the corresponding stage of said first multi-stage store holding an information sample and signal generating means for generating said overload signal when more than a first predetermined number of said binary stages are switched to said one state and for generating said underload signal when less than a second predetermined number, smaller than said first predetermined number, of said binary stages are switched to one state.

9. A television transmission system comprising a signal transmission system according to claim 1 wherein the television system comprises a transmitter and a receiver, the transmitter having a scanner for translating a television picture into the corresponding information signal, and the sample supply rate information being in the form of a scanning position signal.

10. The invention according to claim 3 wherein said given form is digital.

11. The invention according to claim 3 wherein said given form after conversion is analogue.

12. A system according to claim 4 in which said plurality of sampling intervals is three, said intervals being ½ N microsecond, 3/2 N microsecond and 9/2 N microsecond.

13. A signal transmission system having a transmission channel, a source of an information signal, a detail content detector unit for estimating the detail content of picture samples in digital form continuously and for providing a corresponding detail level signal, an analogue-to-digital converter supplied with the information signal to provide an evaluation of the information signal amplitude in digital form at discrete sampling instants, the interval between any two consecutive sampling instants being chosen as the shortest one from a plurality of predetermined sampling intervals, a first multi-stage store for storing information about the samples of the information signal amplitude, means for supplying to the first store selected digital information signal samples at any one of said plurality of predetermined sample intervals, the sample intervals between information samples supplied to the first store defining a plurality of predetermined sample supply rates, the choice of sample supply rate being determined by the detail level signal, means for extracting from the first store said information about said samples at a first extraction rate, means for supplying said information about said samples, extracted from the first store, to said transmission channel, a second multi-stage store for storing information about the sample supply rate defining the intervals between successive samples of the information signal, means for supplying information about the sample rate to the second multi-stage store, means for extracting from the second store the information stored therein at a second extraction rate, means for supplying the information extracted from the second store to the transmission channel, and means at the output of the transmission channel for respacing the information signal samples according to the sample supply rate information, the analogue-to-digital converter providing evaluation of the information signals in parallel binary form as binary signals on a plurality of parallel lines, said parallel lines being connected to supply said detail detector unit, the means for supplying to the first store selected digital signal samples at any one of the plurality of predetermined sampling intervals comprises a supply rate selector controlled by the detail level signal from the detector unit, in which said plurality of predetermined sampling interlas is greater than two and in which the supply rate selectors selects the shortest one of the plurality of sampling intervals corresponding to the high detail signal from the detail detector and selects one of the longer of the plurality of sampling intervals corresponding to the low detail signal from the detail detector unit, said supply rate selector providing a control signal to open a supply gate for every signal sample supplied to the first store and said plurality of parallel lines from the analogue-to-digital converter being connected to supply the parallel-binary information signal samples to the supply gate by way of a delay unit.

14. A system according to claim 13 in which the supply rate selector controls the supply gate to supply information samples to the first multi-stage store at a sample supply rate not greater than said predetermined sample extraction rate in the presence of an overload signal from said storage content unit and at a sample supply rate not less than the predetermined sample extraction rate in the presence of an underload signal from the storage content unit.

15. A television or other data transmission system having a transmitter and a receiver connected by a transmission channel of predetermined bandwidth more than sufficient to accommodate the bandwidth of low-detail signals, but less than sufficient to accommodate the bandwidth of high-detail signals; the transmitter having a scanner for translating a television picture into a corresponding picture signal; an analogue-to-digital converter supplied with the picture signal to provide an output signal that is a digital evaluation of picture signal amplitude at discrete sampling instants, the sampling instants being spaced by the shortest one of a plurality of predetermined sample intervals, a detail detector for examining the picture signal samples in digital form and for estimating the detail content of the picture signal continuously according to one of a plurality of discrete picture detail levels, and for providing a corresponding picture detail level signal, a first multiple-stage store for storing the digital picture signal samples, means for supplying to the first store selected picture signal samples in digital form at any one of the said plurality of predetermined sample intervals, the sample intervals between picture samples supplied to the first store defining a plurality of predetermined sample supply rates, the choice of sample supply rate being determined by the picture detail level signal, means for extracting from the first store said digital samples at a predetermined extraction rate, means for supplying said samples to said transmission channel, a storage content unit for continuously examining the number of digital samples contained in said first store and for providing an overload and an underload signal, respectively, as the first store becomes full or becomes empty, said overload or underload signal being effective to override said choice of digital sample supply rate to the first store and to choose a digital sample supply rate not greater than the sample extraction rate in the case of the overload signal or a digital sample supply rate not less than the sample extraction rate in the case of the underload signal, a sample supply rate coder for providing digital numbers defining the interval between successive digital picture signal samples supplied to the first store, a second multiple stage store for storing the sample supply rate numbers at the sample supply rate determined by the said picture detail level signal and coincidentaly with one of the two picture samples to which it relates, means for extracting from the second store said sample supply rate numbers at the said predetermined extraction rate and means for supplying said sample supply rate numbers to said transmission channel, and said receiver being supplied both with a picture signal derived from said picture signal samples and a scanning position signal derived from said sample supply rate numbers.

References Cited

UNITED STATES PATENTS

| | | | |
|---|---|---|---|
| 2,974,195 | 3/1961 | Julesz | 325—38 |
| 3,006,991 | 10/1961 | Cherry | 179—15.55 |
| 3,225,333 | 12/1965 | Vinal | 179—15.55 |

DAVID G. REDINBAUGH, *Primary Examiner.*

J. A. ORSINO, *Assistant Examiner.*